US012037178B2

(12) United States Patent
Todaka

(10) Patent No.: US 12,037,178 B2
(45) Date of Patent: Jul. 16, 2024

(54) BAG-LIKE CONTAINER AND BAG-LIKE CONTAINER PRODUCTION METHOD

(71) Applicant: IDEMITSU UNITECH CO.,LTD., Tokyo (JP)

(72) Inventor: Takumi Todaka, Chiba (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 37 days.

(21) Appl. No.: 17/621,274

(22) PCT Filed: Jun. 24, 2020

(86) PCT No.: PCT/JP2020/024864
§ 371 (c)(1),
(2) Date: Dec. 21, 2021

(87) PCT Pub. No.: WO2020/262477
PCT Pub. Date: Dec. 30, 2020

(65) Prior Publication Data

US 2022/0355996 A1 Nov. 10, 2022

(30) Foreign Application Priority Data

Jun. 28, 2019 (JP) ................................ 2019-121107
Mar. 19, 2020 (JP) ................................ 2020-049309

(51) Int. Cl.
*B65D 81/05* (2006.01)
*B31B 70/81* (2017.01)
(Continued)

(52) U.S. Cl.
CPC ........ *B65D 81/052* (2013.01); *B31B 70/8131* (2017.08); *B65D 33/01* (2013.01); *B65D 33/2508* (2013.01); *B31B 2150/003* (2017.08)

(58) Field of Classification Search
CPC ................ B65D 33/25; B65D 33/2508; B65D 33/2516; B65D 33/2525; B65D 33/2533;
(Continued)

(56) References Cited

U.S. PATENT DOCUMENTS

2009/0005228 A1 1/2009 Goto et al.
2010/0160131 A1 6/2010 Goto et al.
(Continued)

FOREIGN PATENT DOCUMENTS

JP 40001572 Y1 1/1965
JP 2000079951 A 3/2000
(Continued)

OTHER PUBLICATIONS

KR100415393B1Translation (Year: 2004).*
International Search Report PCT/JP2020/024864 dated Dec. 28, 2021 (pp. 1-7).

*Primary Examiner* — Jes F Pascua
*Assistant Examiner* — Nina K Attel
(74) *Attorney, Agent, or Firm* — Millen, White, Zelano & Branigan, P.C.; Ryan R. Pool

(57) ABSTRACT

According to an aspect of the invention, provided is a bag-shaped container including a tubular film and at least one pair of engagement portions. The tubular film has an inner surface and an outer surface, and is folded in a manner that the outer surface configures both an inner surface of a bag body and an outer surface of the bag body. The at least one pair of engagement portions projects from the inner surface of the bag body, and engages with each other.

8 Claims, 17 Drawing Sheets

(51) Int. Cl.

| | |
|---|---|
| ***B65D 33/01*** | (2006.01) |
| ***B65D 33/25*** | (2006.01) |
| *B31B 150/00* | (2017.01) |

(58) Field of Classification Search

CPC .............. B65D 33/2541; B65D 33/255; B65D 33/2558; B65D 33/2566; B65D 33/2575; B65D 33/2583; B65D 33/2584; B65D 33/2585; B65D 33/2586; B65D 33/25865; B65D 33/2587; B65D 33/2588; B65D 33/2589; B65D 33/259; B65D 33/2591; B65D 81/052; B65D 81/3893; B65D 33/01

USPC ........................ 383/61.1, 100, 101, 3, 63–65

See application file for complete search history.

(56) References Cited

U.S. PATENT DOCUMENTS

| | | | | |
|---|---|---|---|---|
| 2017/0152085 | A1* | 6/2017 | Septien Rojas .... | B65D 33/2541 |
| 2017/0190476 | A1 | 7/2017 | Goto et al. | |

FOREIGN PATENT DOCUMENTS

| | | | |
|---|---|---|---|
| JP | 2003040337 | A | 2/2003 |
| JP | 3134676 | U | 8/2007 |
| JP | 2015116269 | A | 6/2015 |
| JP | 2015217980 | A | 12/2015 |
| JP | 2016127886 | A | 7/2016 |
| KR | 100415393 | B1 * | 1/2004 |
| WO | 06075644 | A1 | 7/2006 |

* cited by examiner

200

BAG-LIKE CONTAINER AND BAG-LIKE CONTAINER PRODUCTION METHOD

TECHNICAL FIELD

The invention relates to a bag-shaped container and a method of manufacturing a bag-shaped container.

BACKGROUND ART

In order to prevent damage to a product, for example, during transportation, a shock-absorbing packaging material is generally used. As such a packaging material, a foam cushioning material (foam film) is often used, and a technique of forming a packaging bag using the foam film is also known. This case has an advantage in that it is not necessary to separately prepare the shock-absorbing packaging material; however, there is an issue that, for example, a process of attaching a fastener such as a zipper tape to the packaging bag is complicated. To overcome such an issue, Patent Literature 1 discloses a method of manufacturing a foam film equipped with a fastener, the method including: forming a large number of recesses in a recess forming film; thereafter adhering the film to a base film in order to seal the recesses, thereby obtaining a foam film; and, concurrently with or before or after the adhering, adhering a fastener to a portion of a surface on a protrusion side of the foam film where no protrusion is present.

CITATION LIST

Patent Literature

Patent Literature 1: JP 2000-79951 A

SUMMARY OF THE INVENTION

Problems to be Solved by the Invention

According to the technique of Patent Literature 1 described above, it is possible to use a general film as a surface material of a packaging bag while imparting a shock-absorbing property to a container, and also to achieve automatic and continuous production. However, a process of attaching a fastener to a foam film is still more complicated as compared with a case of using an ordinary film.

Accordingly, an object of the invention is to provide a bag-shaped container and a method of manufacturing a bag-shaped container which make it possible to allow a container to have a shock-absorbing property by a more simplified manufacturing process.

Means for Solving the Problems

According to an aspect of the invention, a bag-shaped container includes a tubular film and at least one pair of engagement portions, the tubular film being folded in a manner that the outer surface configures both an inner surface of a bag body and an outer surface of the bag body; and at least one pair of engagement portions that projects from the inner surface of the bag body, the engagement portions engaging with each other.

In the bag-shaped container according to the above aspect, at least one closed space facing the inner surface of the tubular film may be formed. In the above aspect, the bag-shaped container may further include a member forming an air vent communicating with the closed space. In the above aspect, a slit may be provided along an opening of the bag body, in any one of the tubular film overlapped with each other on the side near the opening of the bag body, and the member forming the air vent may be inserted through the slit in a manner that one end of the member is positioned inside the tubular film and the other end thereof is positioned outside the tubular film. Further, the slit may be provided along the opening over an entire width of the bag body, and a seal portion may be provided on each of both sides of the slit to bond parts of the inner surface of the tubular film to each other and to bond the member forming the air vent and the inner surface of the tubular film to each other. Alternatively, the member forming the air vent may be provided across a seal portion and be interposed between parts of the inner surface of the tubular film, the seal portion being provided between parts of the inner surface of the tubular film and between parts of the outer surface of the tubular film that configures the inner surface of the bag body. In each case described above, the member forming the air vent may have a pair of surfaces sandwiched by parts of the seal portion. The pair of surfaces may be formed by a plurality of films, a single folded film, or a single film formed in a tubular shape.

In the bag-shaped container according to the above aspect, in each of respective regions near sites where the at least one pair of engagement portions project, the inner surfaces of the tubular film are bonded to each other between portions of the tubular film that configure the inner surface of the bag body and the outer surface of the bag body respectively.

The bag-shaped container according to the above aspect may further include a pair of base strips that are bonded to the inner surface of the bag body, in which the engagement portions may project from the inner surface of the bag body via the pair of base strips.

In the bag-shaped container according to the above aspect, one of the pair of base strips may not be bonded to the inner surface of the bag body in a part near the opening of the bag body in relation to a position where the engagement portion projects.

In the bag-shaped container according to the above aspect, the outer surface of the tubular film includes a resin including polyethylene as a main component.

According to another aspect of the invention, a method of manufacturing a bag-shaped container includes, in which the bag-shaped container includes a tubular film having an inner surface and an outer surface, the tubular film is folded in a manner that the outer surface configures both an inner surface of a bag body and an outer surface of the bag body, and a zipper tape includes a pair of base strips bonded to the inner surface of the bag body and engagement portions projecting from the respective pair of base strips: conveying the tubular film and the zipper tape continuously in a longitudinal direction to wind the tubular film and the zipper tape around a circumferential surface of a drum in a state in which the tubular film and the zipper tape are overlapped with each other; and heat-sealing the zipper tape to the tubular film by using a seal bar having a sealing surface, the sealing surface being opposed to the circumferential surface of the drum.

In the method according to the above aspect, at least one of the circumferential surface of the drum or the sealing surface of the seal bar may have a groove, the groove extending along a direction in which the tubular film and the zipper tape are conveyed, and having a width larger than a width of each of the engagement portions, and each of the engagement portions may pass through the groove. Moreover, the method according to the above aspect may further include: forming a slit in any one of the tubular film at a position where the zipper tape is to be heat-sealed to the tubular film or along the zipper tape which is heat-sealed to the tubular film; inserting, through the slit, a member forming an air vent from outside the tubular film to inside the tubular film; and bonding, on both sides of the slit, parts of the inner surface of the tubular film to each other and the member forming the air vent and the inner surface of the tubular film to each other.

The configurations described above allows the bag-shaped container to have a shock-absorbing property by: configuring the bag body to have two sheets of films by using the tubular film in a form of being folded; and enclosing gas, for example, in the closed space between the films. Further, the tubular film itself is a single film, and is thus manufactured by a more simplified process as compared with a case of using a foam film in which multiple films are adhered to each other. Therefore, the invention makes it possible to impart the shock-absorbing property to the container by the more simplified manufacturing process.

DESCRIPTION OF EMBODIMENT(S)

The following describes preferred embodiments of the invention in detail with reference to the accompanying drawings. It is to be noted that, in this description and the accompanying drawings, components that have substantially the same functional configuration are indicated by the same reference signs, and thus redundant description thereof is omitted.

First Exemplary Embodiment

Figure 1:
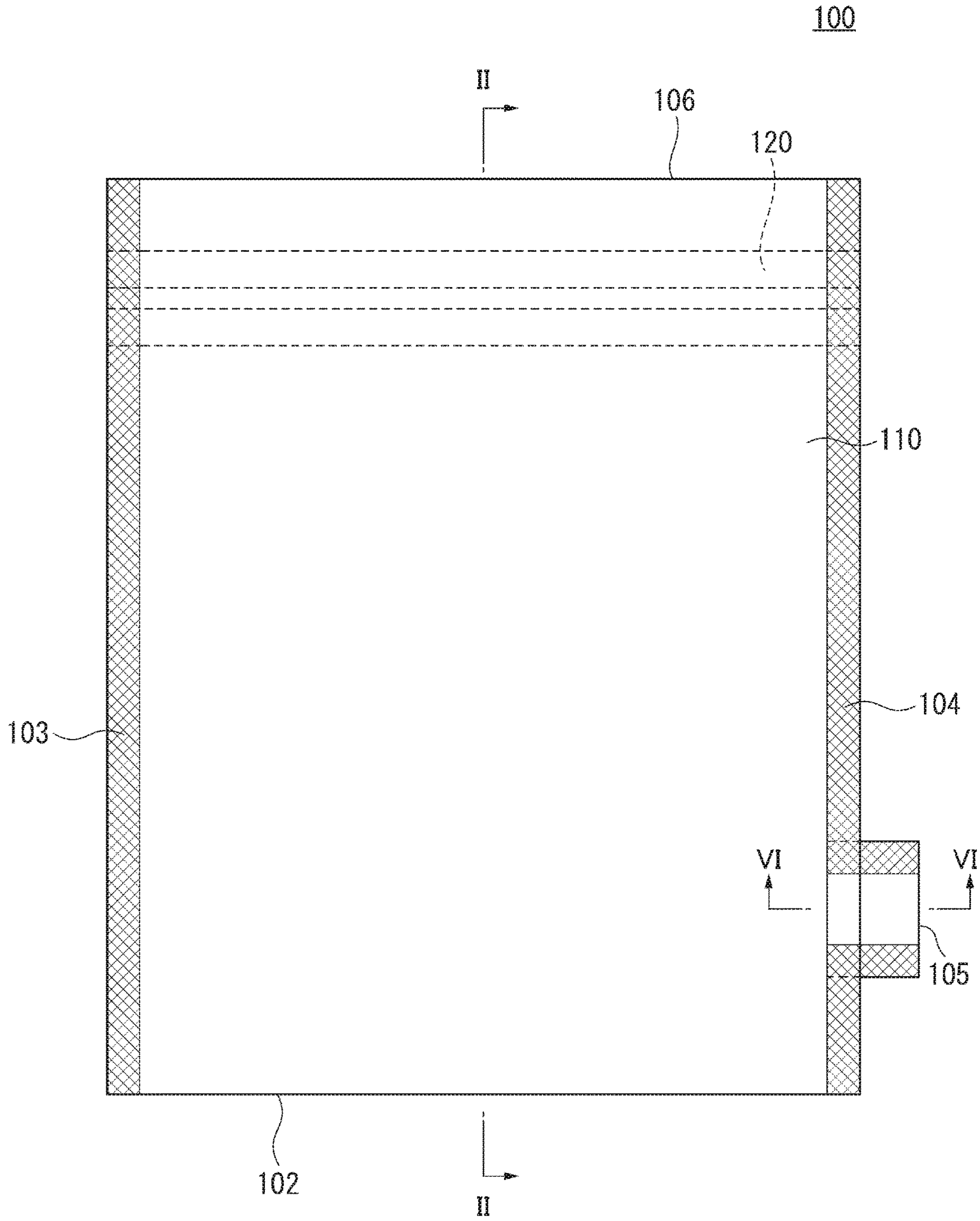
FIG. 1 is a plan view of a bag-shaped container according to a first embodiment of the invention.
Figure 2:
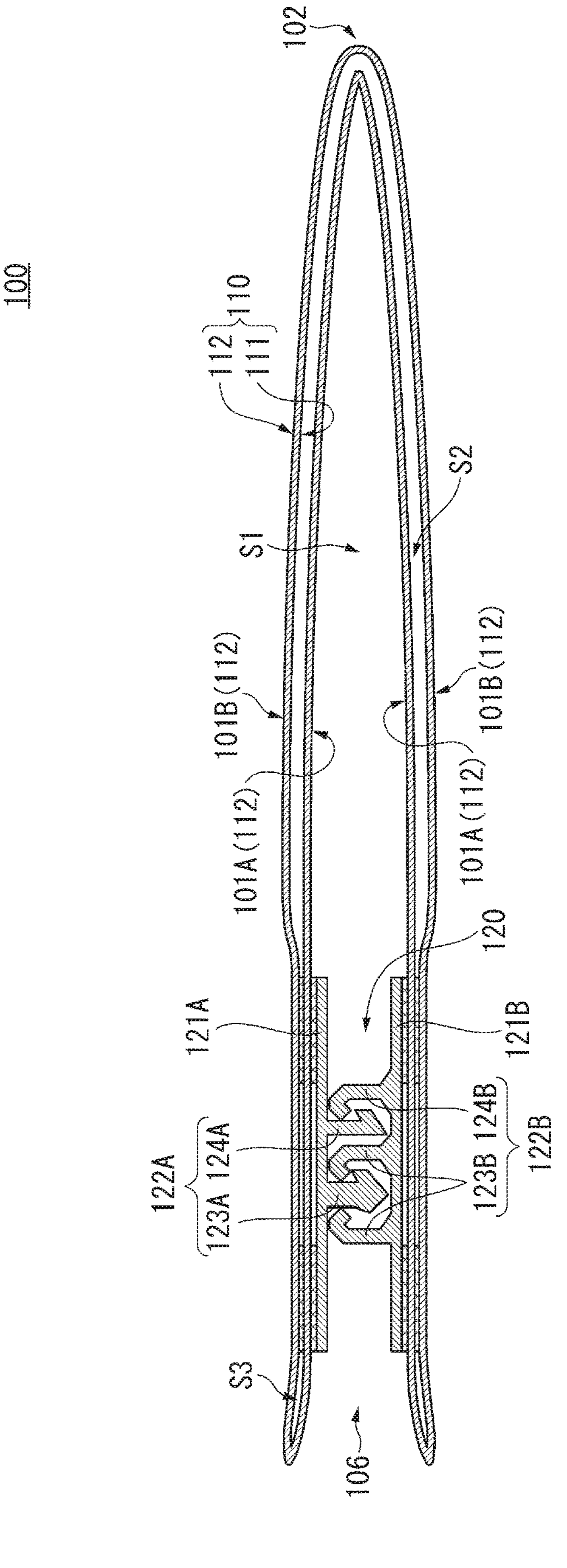
FIG. 2 is a cross-sectional view taken along a line II-II of FIG. 1.

FIG. 1 is a plan view of a bag-shaped container according to a first exemplary embodiment of the invention. FIG. 2 is a cross-sectional view taken along a line II-II of FIG. 1. As illustrated in FIGS. 1 and 2, a bag-shaped container 100 according to the first exemplary embodiment includes: a tubular film 110 that configures a bag body; and a zipper tape 120 attached to the tubular film 110. As illustrated in FIG. 2, the bag-shaped container 100 does not have a containing space in such a manner that the containing space faces an inner surface 111 of the tubular film 110, but has a containing space S1 in such a manner that, because the tubular film 110 is folded at a bottom portion 102 of the bag body, the containing space S1 faces an outer surface 112 of the tubular film 110. In this case, the outer surface 112 of the tubular film 110 configures both an inner surface 101A of the bag body and an outer surface 101B of the bag body. Both sides of the bag body are sealed by side seal portions 103 and 104.

The tubular film 110 includes, for example, a single-layer or multi-layer thermoplastic resin. More specifically, the tubular film 110 may include low density polyethylene (LDPE), linear low density polyethylene (LLDPE), or polypropylene (PP). PP may be polypropylene homopolymer (HPP), polypropylene random copolymer (RPP), or polypropylene block copolymer (BPP). In a case where the tubular film 110 is a multi-layered stack, LDPE, LLDPE, or PP may be laminated to form surface layers, and an a material such as nylon may be layered therebetween to form an intermediate layer. In this case, the surface layers and the intermediate layer may be adhered to each other via an adhesion layer such as an acid-modified polyolefin.

In the side seal portions 103 and 104, in addition to that parts of the outer surface 112 of the tubular film 110 which face each other each serving as the inner surface 101A of the bag body are bonded to each other, parts of the inner surface 111 of the tubular film 110 are also bonded to each other. As a result, in the bag-shaped container 100, separately from the containing space S1, a closed space S2 facing the inner surface 111 of the tubular film 110 is formed. Enclosing gas such as air in the closed space S2, for example, makes it possible to mitigate impact on contents contained in the containing space S1. The bag body may be provided with an air vent member 105 through which gas is to be injected into the closed space S2 after bag manufacturing processing. The air vent member 105 may be, for example, a portion of the tubular film 110, or may include another film bonded to the tubular film 110. The air vent member 105 also operates as a check valve as described below.

The zipper tape 120 includes: a base strip 121A and a base strip 121B; and an engagement portion 122A and an engagement portion 122B that respectively project from the base strip 121A and the base strip 121B, and are engageable with each other. In the example illustrated in FIG. 2: the engagement portions 122A and 122B include a male engagement portion 123A and a hook engagement portion 124A each projecting from the base strip 121A, and a female engagement portion 123B and a hook engagement portion 124B each projecting from the base strip 121B; the male engagement portion 123A and the female engagement portion 123B are engageable with each other; and the hook engagement portion 124A and the hook engagement portion 124B are engageable with each other. Specific configurations of the engagement portions 122A and 122B are not limited to the illustrated example, and configurations of various known engagement portions are applicable. The base strips 121A and 121B are bonded to the inner surface 101A of the bag body, i.e., the outer surface 112 of the tubular film 110, on an opposite side to a side from which the engagement portions 122A and 122B project, whereby the engagement portions 122A and 122B project from the inner surface 101A of the bag body.

The zipper tape 120 is formed, for example, by extrusion molding of a polyolefin-based resin. More specifically, the zipper tape 120 may include low density polyethylene (LDPE), linear low density polyethylene (LLDPE), or polypropylene (PP). PP may be polypropylene homopolymer (HPP), polypropylene random copolymer (RPP), or polypropylene block copolymer (BPP). A material of the zipper tape 120 may optionally be added with a known additive, e.g., a stabilizer, an antioxidant, a lubricant, an antistatic agent, or a colorant.

In the present exemplary embodiment, the base strips 121A and 121B of the zipper tape 120 are bonded to the inner surface 101A of the bag body, and the engagement portions 122A and 122B project from the inner surface 101A of the bag body via the base strips 121A and 121B. As will be described later, the base strips 121A and 121B are bonded to the tubular film 110 by, for example, a heat-sealing process. In this case, heat is also applied to the outer surface 101B of the bag body. Accordingly, in the bag-shaped container 100, in each of respective regions near sites where the engagement portions 122A and 122B project, a part of the inner surface 111 of the tubular film 110 in a portion of the tubular film 110 that configures the inner surface 101A of the bag body and a part of the inner surface 111 of the tubular film 110 in a portion of the tubular film 110 that configures the outer surface 101B of the bag body are bonded to each other.

In the bag-shaped container 100, the space facing the inner surface 111 of the tubular film 110 is thus divided to obtain a closed space S3 which is another space from the above-described closed space S2. In the example illustrated in FIGS. 1 and 2, the gas does not flow between the closed space S2 and the closed space S3 owing to the bonding between the parts of the inner surface 111. Therefore, even if, for example, the closed space S2 expands by injection of the gas, the gas does not flow into the closed space S3, and the closed space S3 does not expand. In this case, it becomes easier to open the bag-shaped container 100 by grasping a portion of the tubular film 110 including the closed space S3, i.e., a portion between an opening 106 and the zipper tape 120 of the bag-shaped container 100.

Process of Manufacturing Bag-shaped Container

Figure 3:
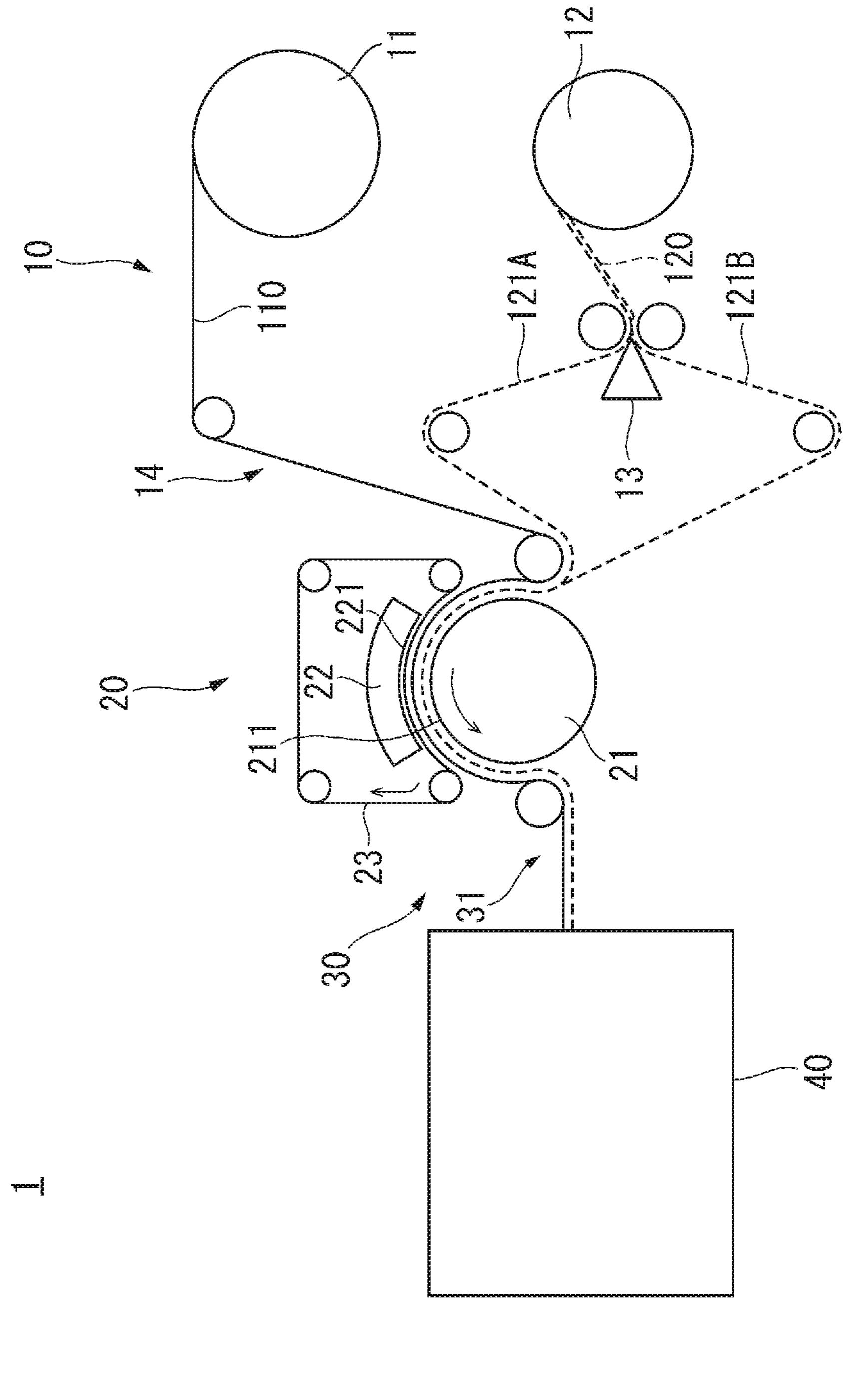
FIG. 3 is a diagram illustrating a schematic configuration of a manufacturing apparatus that manufactures the bag-shaped container according to the first embodiment of the invention.
Figure 4:
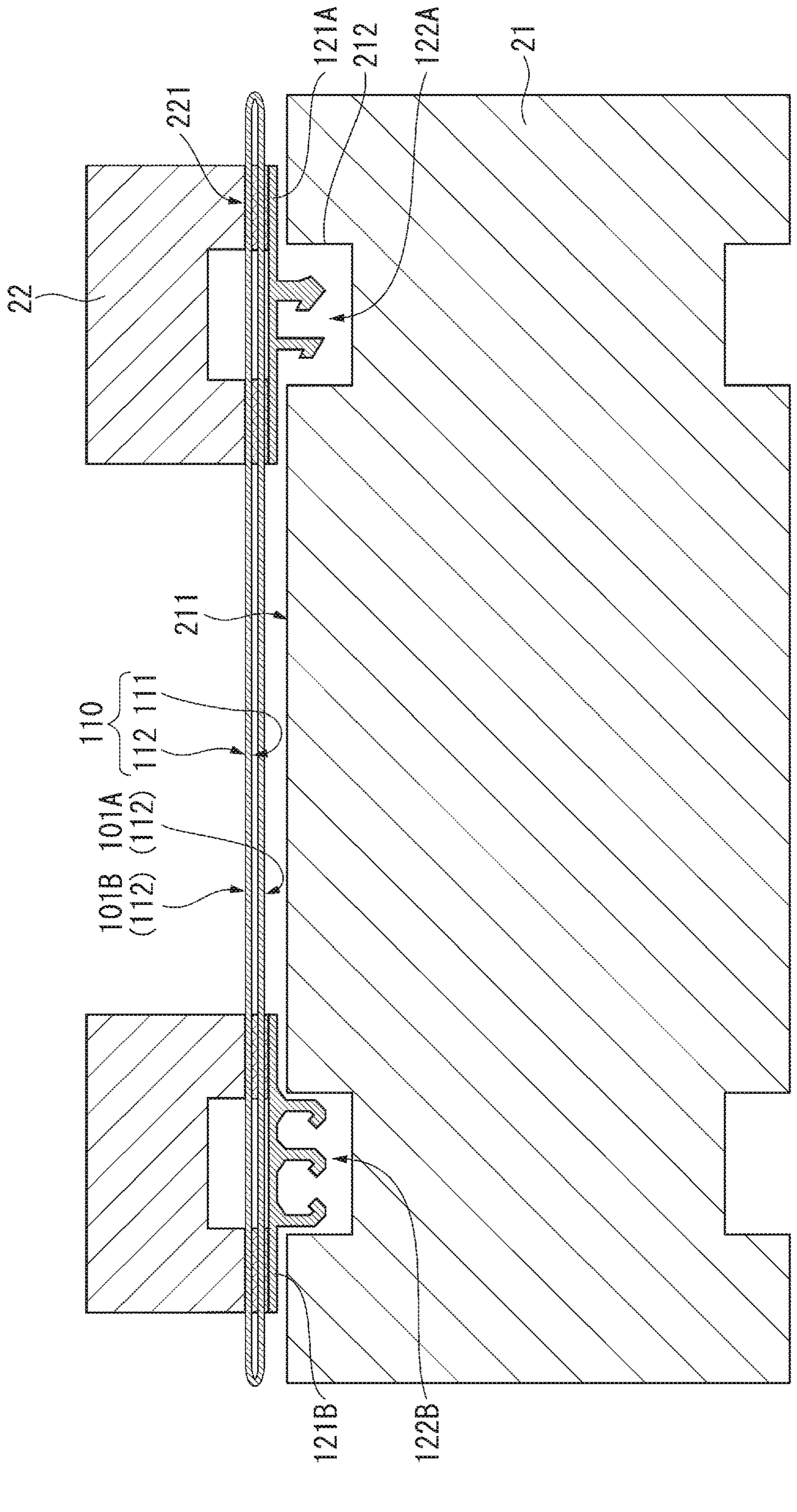
FIG. 4 is an enlarged cross-sectional view of a drum sealing section of the manufacturing apparatus illustrated in FIG. 3.

FIG. 3 is a diagram illustrating a schematic configuration of a manufacturing apparatus that manufactures the bag-shaped container according to the first exemplary embodiment of the invention. FIG. 4 is an enlarged cross-sectional view of a drum sealing section of the manufacturing apparatus illustrated in FIG. 3. As illustrated in FIG. 3, a manufacturing apparatus 1 includes a feeder 10, a drum sealing section 20, a transfer section 30, and a bag-manufacturing section 40.

The feeder 10 includes: a film roll 11 that feeds the tubular film 110; a tape-winding roll 12 that feeds the zipper tape 120; a separator 13 that separates the zipper tape 120 drawn from the tape-winding roll 12 into a base strip 121A and a base strip 121B; and a transfer device 14. The transfer device 14 overlays the tubular film 110 and the base strip 121A or the base strip 121B of the zipper tape 120 on top of each other, while conveying each of the members in a longitudinal direction thereof, and feeds the overlapped members to the drum sealing section 20. As illustrated in FIG. 4, the base strip 121A and the base strip 121B of the zipper tape 120 are each overlapped with respective portions of the tubular film 110 that are different from each other.

The drum sealing section 20 includes: a drum 21 that is rotatable; a seal bar 22 having a sealing surface 221 that faces a circumferential surface 211 of the drum 21; and an endless belt 23 interposed between the circumferential surface 211 and the sealing surface 221. The endless belt 23 is disposed in such a manner as to be movable in synchronization with the circumferential surface 211 along a portion that faces the circumferential surface 211 of the drum 21. It is to be noted that the drum 21, the endless belt 23, or both may be driven by a drive device such as, for example, an electric motor. The tubular film 110, and the base strip 121A and the base strip 121B of the zipper tape 120 fed from the feeder 10 in a state of being overlapped with each other are wound around the circumferential surface 211 of the drum 21, and the base strip 121A and the base strip 121B of the zipper tape 120 are each heat-sealed to the tubular film 110, by the sealing surface 221 of the seal bar 22 that is to be abutted against the circumferential surface 211.

Here, in the example illustrated in FIG. 4, the circumferential surface 211 of the drum 21 has a groove 212 extending along a circumferential direction of the drum 21, i.e., a direction in which the tubular film 110 and the zipper tape 120 are conveyed. The groove 212 is at, in terms of an axis direction of the drum 21, a position where the engagement portions 122A and 122B of the zipper tape 120 pass when the tubular film 110 and the zipper tape 120 are wound around the circumferential surface 211 in the state of being overlapped with each other. A width of the groove 212 is, for example, greater than a width of each of the engagement portions 122A and 122B, and less than a width of each of the base strips 121A and 121B. Providing such a groove 212 and allowing each of the engagement portions 122A and 122B to pass the groove 212 make it possible to prevent the engagement portions 122A and 122B from interfering with the circumferential surface 211 of the drum 21, and to stably bond the tubular film 110 to the base strips 121A and 121B by sandwiching the tubular film 110 and the base strips 121A and 121B between the sealing surface 221 of the seal bar 22 and the circumferential surface 211 with a uniform pressure.

Referring back to FIG. 3, the transfer section 30 includes a transfer device 31 that conveys the tubular film 110 to which the zipper tape 120 is attached to the bag-manufacturing section 40. The bag-manufacturing section 40 manufactures the bag-shaped container 100 as illustrated in FIG. 1 by subjecting the tubular film 110 attached with the zipper tape 120 to processes including folding, bonding, and cutting. As for a configuration of the bag-manufacturing section 40, various known configurations are applicable, and therefore detailed descriptions thereof are omitted. As for a configuration of the manufacturing apparatus 1, in addition to the above description, various known configurations described in, for example, International Publication No. WO 2006/075644, are applicable.

Here, as described above, the tubular film 110 according to the present exemplary embodiment includes a single-layer or multi-layer thermoplastic resin film. Parts, corresponding to the side seal portions 103 and 104, of the inner surface 101A of the bag body are bonded to each other to form the containing space S1, and the inner surface 101A is also bonded to the base strips 121A and 121B of the zipper tape 120. Accordingly, the outer surface 112 of the tubular film 110 that configures the inner surface 101A of the bag body includes an easily sealable thermoplastic resin such as a resin including polyethylene as a main component. More specifically, the tubular film 110 includes a single-layer film of the easily sealable thermoplastic resin, or a multi-layer film in which the easily sealable thermoplastic resin is disposed on an outer surface 112. Thus, as described above, the outer surface 101B of the bag body is also configured by the outer surface 112 of the tubular film 110.

In a case of bonding the zipper tape 120 to the tubular film 110, both sides of the bag body, i.e., an inner surface 101A of the bag body on which the base strips 121A and 121B are overlapped and an outer surface 101B which is a side opposite to the inner surface 101A side, are pressed and heated using the seal bar. However, if the outer surface 101B of the bag body includes the easily sealable thermoplastic resin as described above, wrinkles easily occur upon pressing and heating. In a case of using a sealing device of a type in which a seal bar is intermittently moved up and down to sandwich a zipper tape and a bag body, a pressure applied by the pressing is large and the pressure varies; therefore, the wrinkles easily occur on the outer surface 101B of the bag body, which is likely to deteriorate an appearance of the bag-shaped container 100.

In contrast, in a case of using the manufacturing apparatus 1 including the drum sealing section 20, a tensile force is applied to the tubular film 110 by the drum 21; therefore, a pressure at which the sealing surface 221 of the seal bar 22 presses the tubular film 110 toward the circumferential surface 211 of the drum 21 may be small. In addition, the tubular film 110 passes between the drum 21 and the seal bar 22 while being continuously conveyed, which prevents the pressure applied by the pressing from being varied. As a result, the wrinkles are less likely to occur on the outer surface 101B of the bag body upon bonding the zipper tape 120 to the bag body configured by the tubular film 110, and it is possible to maintain a satisfactory appearance of the bag-shaped container 100.

Modifications

Figure 5:
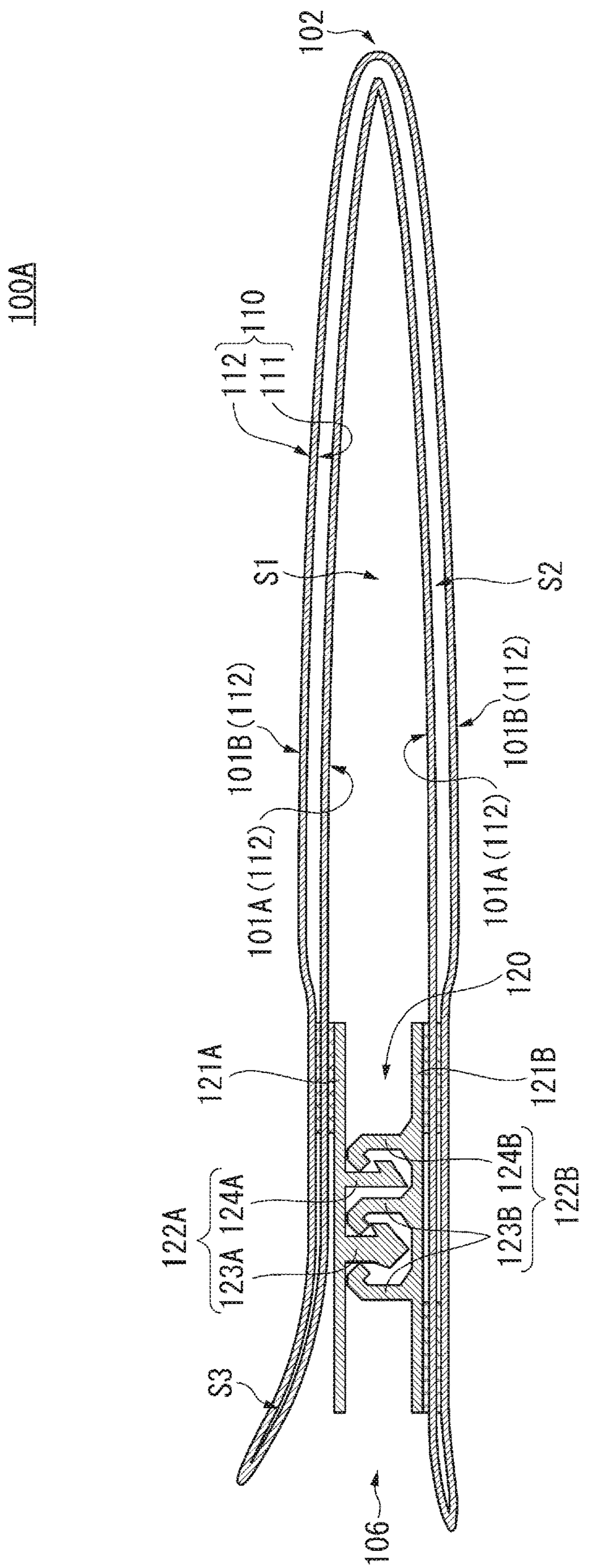
FIG. 5 is a cross-sectional view of a bag-shaped container according to a modification of the first embodiment.

FIG. 5 is a cross-sectional view of a bag-shaped container according to a modification of the first exemplary embodiment. In a bag-shaped container 100A illustrated in FIG. 5, a configuration of a bag body configured by the tubular film 110 and a configuration of the zipper tape 120 are similar to those of the first exemplary embodiment; however, the base strip 121A is not bonded to the inner surface 101A of the bag body near the opening 106 of the bag body in relation to a position where the engagement portion 122A projects. As a result, for example, after the engagement portions 122A and 122B are engaged with each other to seal the bag-shaped container 100A, it becomes difficult to open the bag-shaped container 100A even if a portion between the opening 106 and the zipper tape 120 is grasped, which makes it possible to prevent tampering of the contents. As for a configuration of the zipper tape 120 for preventing tampering of the contents and a configuration of bonded portion between the zipper tape 120 and the tubular film 110, configurations described in, for example, JP 2015-116269 A may be adopted.

Configuration of Air Vent

Figure 6A:
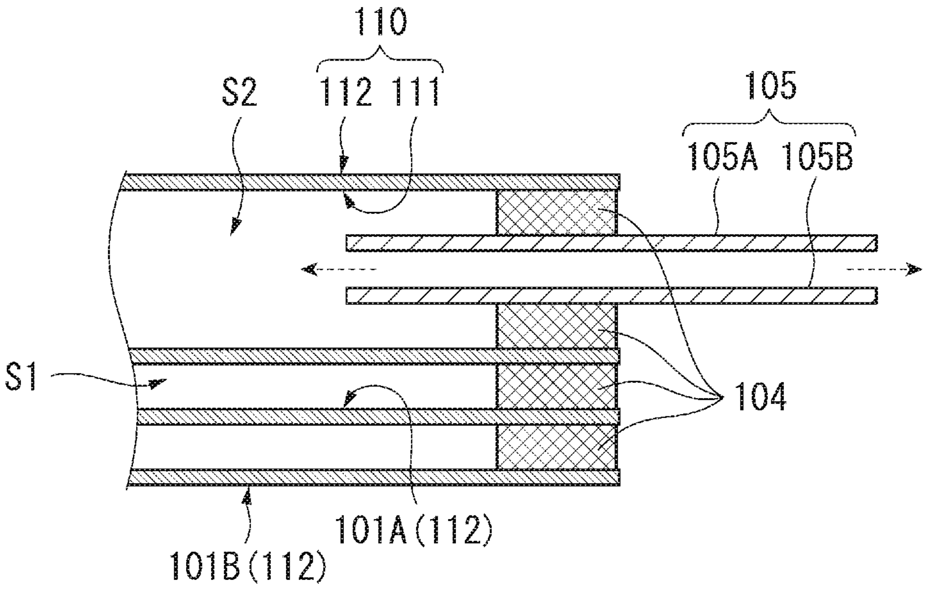
FIG. 6A is a cross-sectional view taken along a line VI-VI of FIG. 1.
Figure 6B:
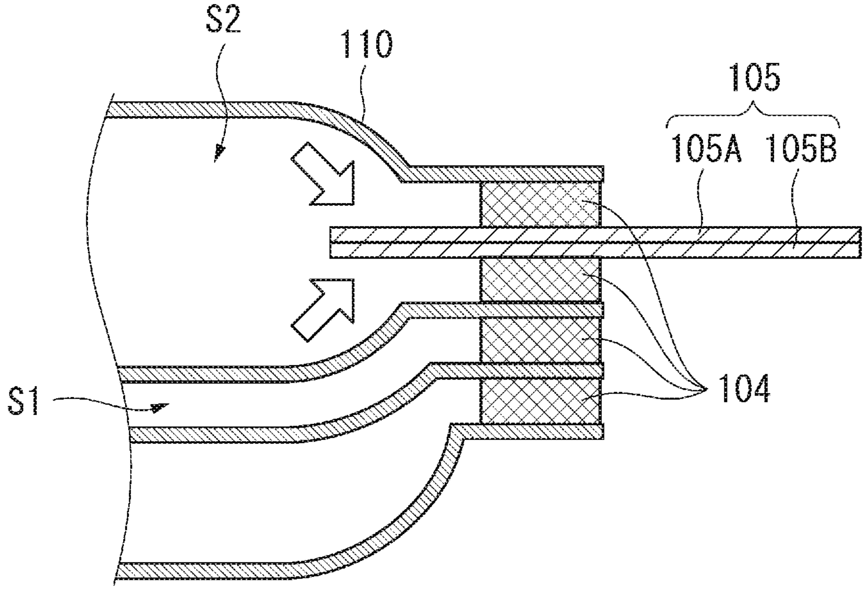
FIG. 6B is another cross-sectional view taken along the line VI-VI of FIG. 1.

FIGS. 6A and 6B are each a cross-sectional view taken along a line VI-VI of FIG. 1. In the illustrated example, the side seal portion 104 is provided between parts of the inner surface 111 of the tubular film 110 and between parts of the outer surface 112 of the tubular film 110 that configures the inner surface 101A of the bag body. The air vent member 105 is provided across such a side seal portion 104, and is interposed between parts of the inner surface 111 of the tubular film 110. The air vent member 105 has a pair of surfaces 105A and 105B sandwiched by parts of the side seal portion 104. In this case, as illustrated in FIG. 6A, the gas flows by passing between the pair of surfaces 105A and 105B when the closed space S2 is not expanded by gas enclosure. In contrast, as illustrated in FIG. 6B, when the closed space S2 is expanded by the gas enclosure, the pair of surfaces 105A and 105B are pressed against each other by the pushed-out tubular film 110, and the gas does not flow through the air vent member 105. The air vent member 105 thus operates as a check valve in the illustrated example. The pair of surfaces 105A and 105B of the air vent member 105 may include, for example, a plurality of films put together in a tubular shape, a single folded film, or a single film formed in a tubular shape.

Second Exemplary Embodiment

Figure 7:
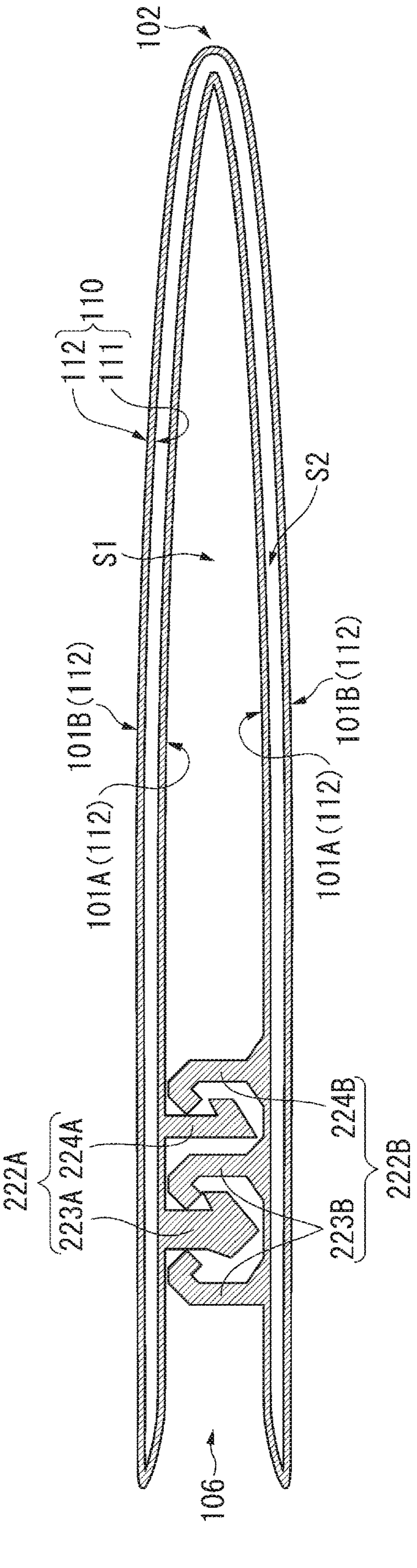
FIG. 7 is a cross-sectional view of a bag-shaped container according to a second embodiment of the invention.

FIG. 7 is a cross-sectional view of a bag-shaped container according to a second embodiment of the invention. A bag-shaped container 200 illustrated in FIG. 7 includes: the tubular film 110 that configures the bag body; and engagement portions 222A and 222B that are each integrally molded with the tubular film 110 and each project from the inner surface 101A of the bag body configured by the outer surface 112 of the tubular film 110. The engagement portions 222A and 222B include a male engagement portion 223A, a female engagement portion 223B, and hook engagement portions 224A and 224B. Those engagement portions are engageable with each other as with the example of the first exemplary embodiment described above. The bag-shaped container 200 according to the present exemplary embodiment is manufactured by, for example, performing extrusion molding (inflation molding) on the tubular film 110 in a cross section including the engagement portions 222A and 222B.

Unlike the first exemplary embodiment, the present exemplary embodiment has no process of heat-sealing the zipper tape. Thus, respective portions of the tubular film 110 that configure the inner surface 101A and the outer surface 101B of the bag body are not bonded to each other in respective regions near sites where the engagement portions 222A and 222B project; therefore, a whole space that faces the inner surface 111 of the tubular film 110 serves as the closed space S2. Also in the present exemplary embodiment, for example, enclosing gas such as air in the closed space S2 makes it possible to mitigate impact on a content contained in the containing space S1.

Third Exemplary Embodiment

Figure 8:
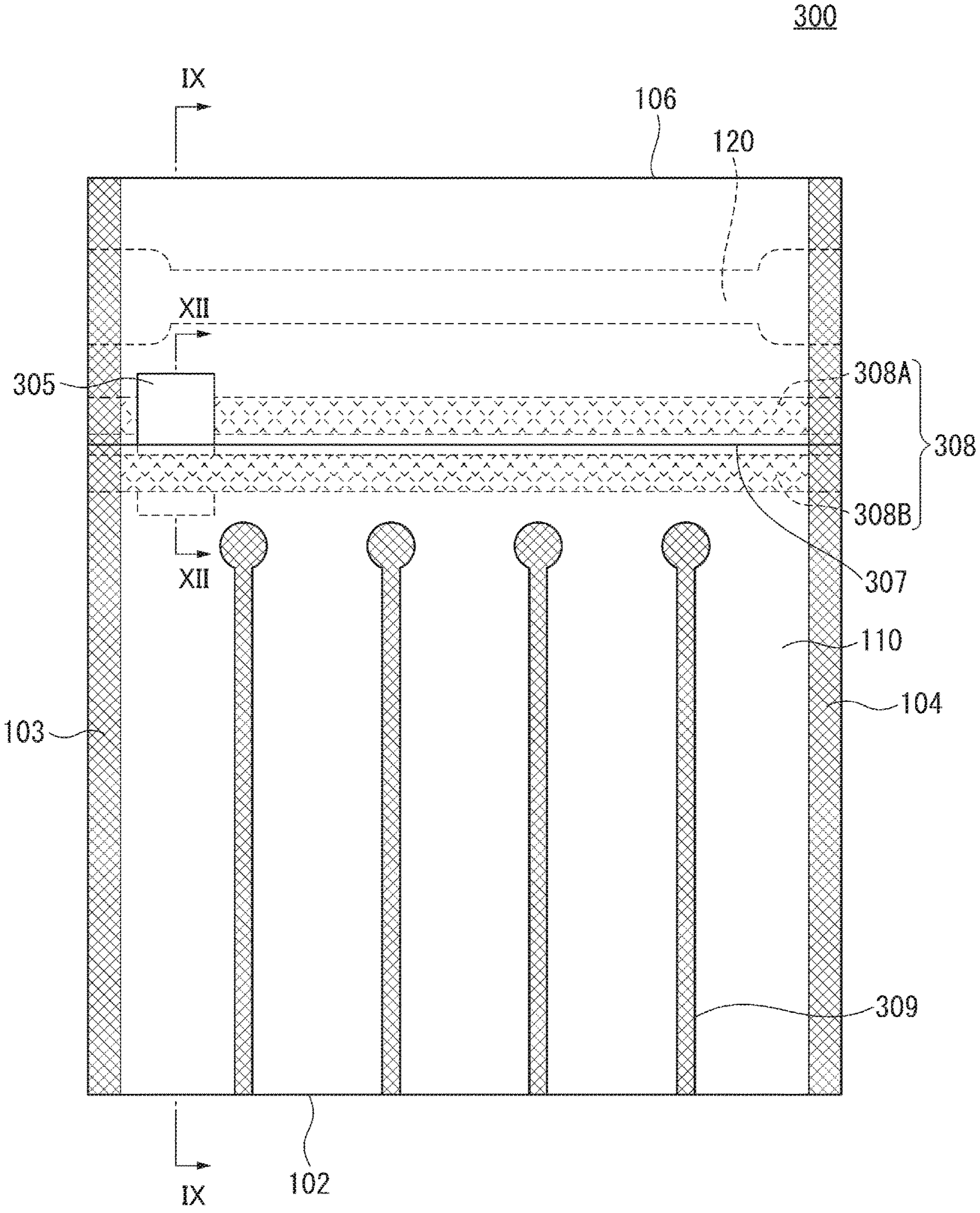
FIG. 8 is a plan view of a bag-shaped container according to a third embodiment of the invention.
Figure 9:
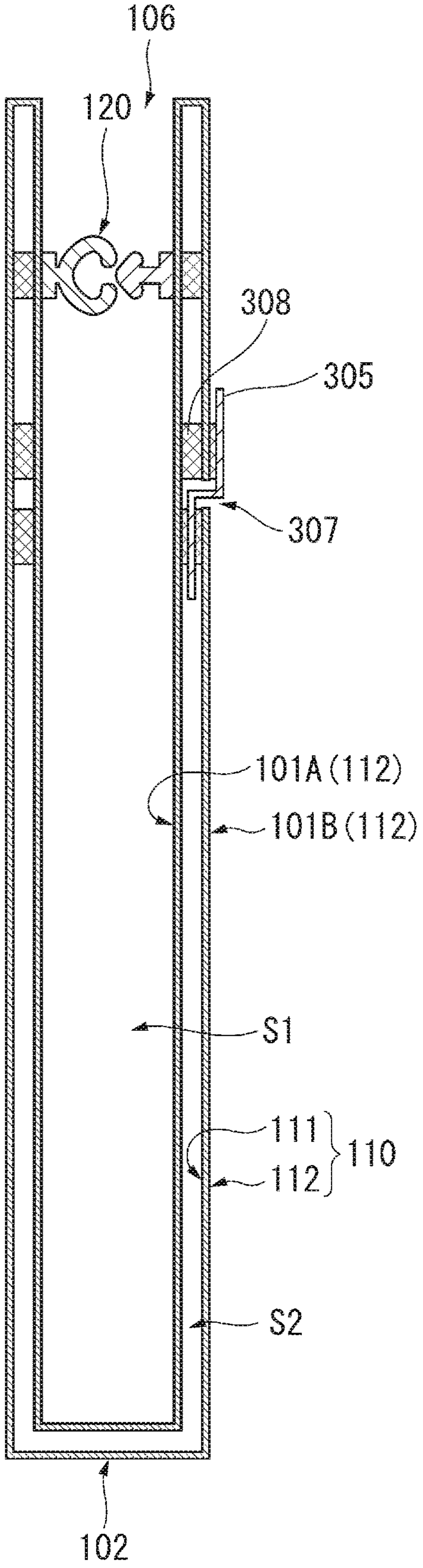
FIG. 9 is a cross-sectional view taken along a line IX-IX of FIG. 8.

FIG. 8 is a plan view of a bag-shaped container according to a third embodiment of the invention. FIG. 9 is a cross-sectional view taken along a line IX-IX of FIG. 8. As illustrated in FIGS. 8 and 9, a bag-shaped container 300 according to the third embodiment includes the tubular film 110 and the zipper tape 120 similar to those of the above-described first exemplary embodiment, and an air vent member 305. In the present exemplary embodiment, a slit 307 is provided in any one of the tubular film 110 that are overlapped with each other near the opening 106 of the bag body. For example, the air vent member 305 formed in a flat tubular shape is disposed in the slit 307 in such a manner that one end of the air vent member 305 is positioned inside the tubular film 110 and the other end thereof is positioned outside the tubular film 110, thereby forming an air vent communicating with the closed space S2. The air vent allows gas such as air to be enclosed in the closed space S2 after bag manufacturing processing. The air vent member 305 also operates as a check valve as described below.

Here, in the illustrated example, four tubular films 110 are overlapped with each other near the opening 106 of the bag body, and the slit 307 is provided in one film that configures the outer surface 101B of the bag body. In another example, a slit may be provided in one film, of the tubular films 110, that configures the inner surface 101A of the bag body. The slit 307 is provided along the opening 106 over an entire width of the bag body. Seal portions 308A and 308B (also collectively referred to as seal portions 308) are provided on respective sides of the slit 307 (on both sides in a direction from the opening 106 to the containing space S1) to bond parts of the inner surface 111 of the tubular film 110 to each other and to bond the air vent member 305 and the inner surface 111 of the tubular film 110 to each other. Providing the seal portion 308 on each of both sides of the slit 307 makes it possible to prevent the gas enclosed in the closed space S2 from leaking out.

Further, in the present exemplary embodiment, a plurality of ribs 309 are provided by bonding parts of the inner surface 111 of the tubular film 110 to each other on a side of the bag body facing a containing space S1. Providing the ribs 309 prevents misalignment between respective parts of the tubular film 110 configuring the inner surface 101A of bag body and the outer surface 101B of bag body, and stabilizes a shape of the bag-shaped container 300 during, for example, bag manufacturing processing. In the illustrated example, the rib 309 is provided across a folded part of the bottom portion 102 of the bag body, and there is a gap between the rib 309 and the seal portion 308 on each of both sides of the slit 307. Providing such a gap makes it possible to allow the gas to flow uniformly inside the closed space S2. It is to be noted that the rib 309 in the illustrated example is merely an example. It is possible to provide other seal portions of various shapes (including, for example, a dot pattern that is not referred to as rib) that bond parts of the inner surface 111 of the tubular film 110 to each other on the side of the bag body facing the containing space S1. In addition, a rib may be provided in the bag-shaped container according to the first exemplary embodiment or the second embodiment described above.

Figure 10:
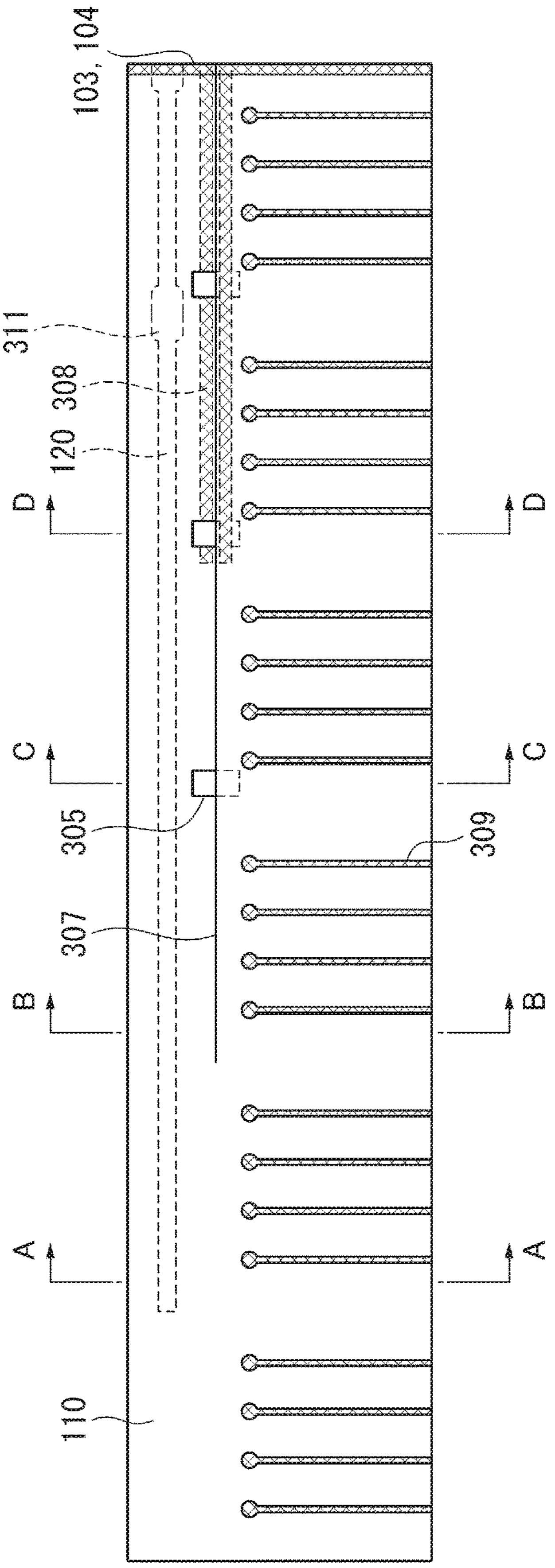
FIG. 10 is a diagram illustrating a process of manufacturing the bag-shaped container according to the third embodiment of the invention.
Figure 11A:
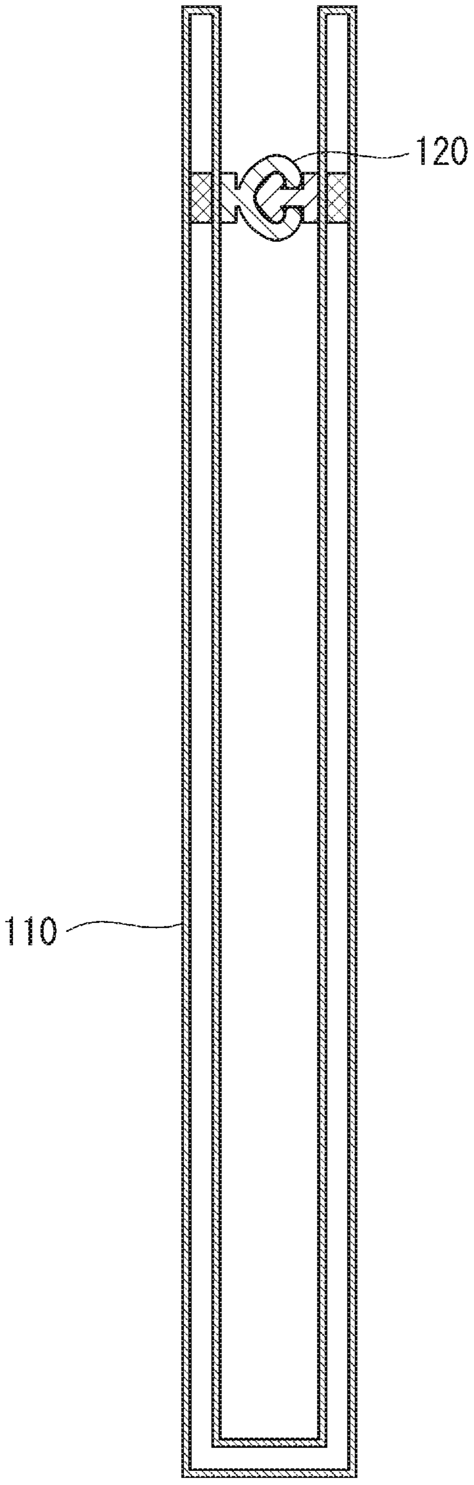
FIG. 11A is a cross-sectional view taken along a line A-A of FIG. 10.
Figure 11B:
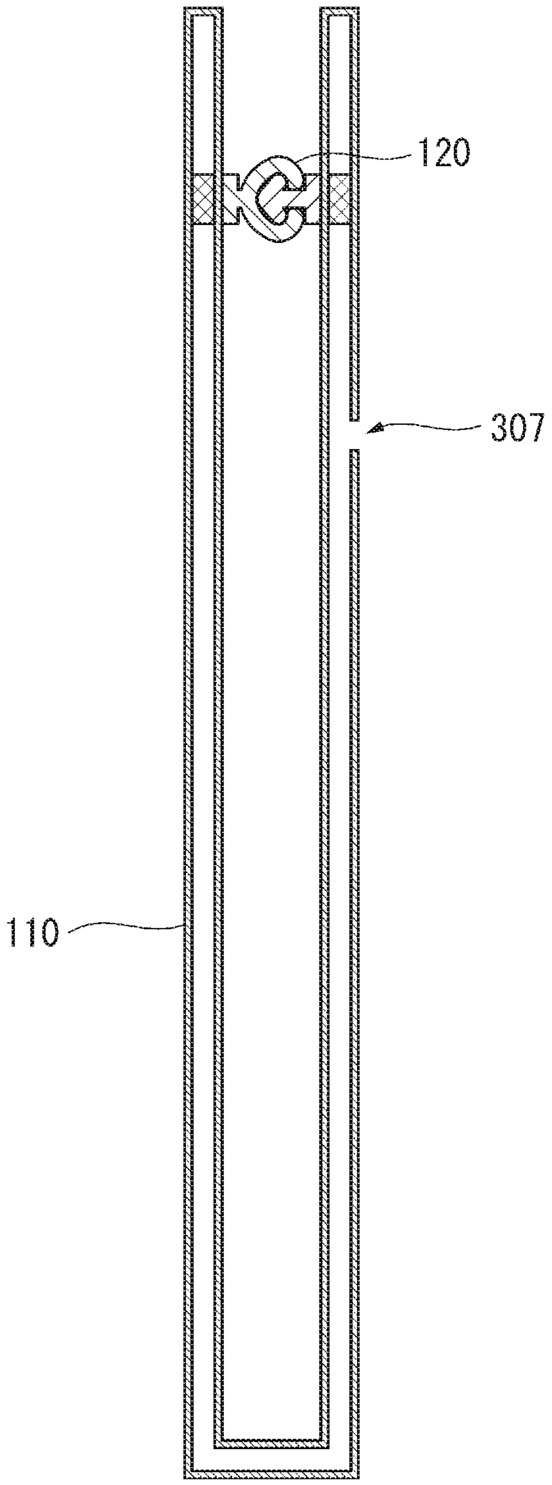
FIG. 11B is a cross-sectional view taken along a line B-B of FIG. 10.
Figure 11C:
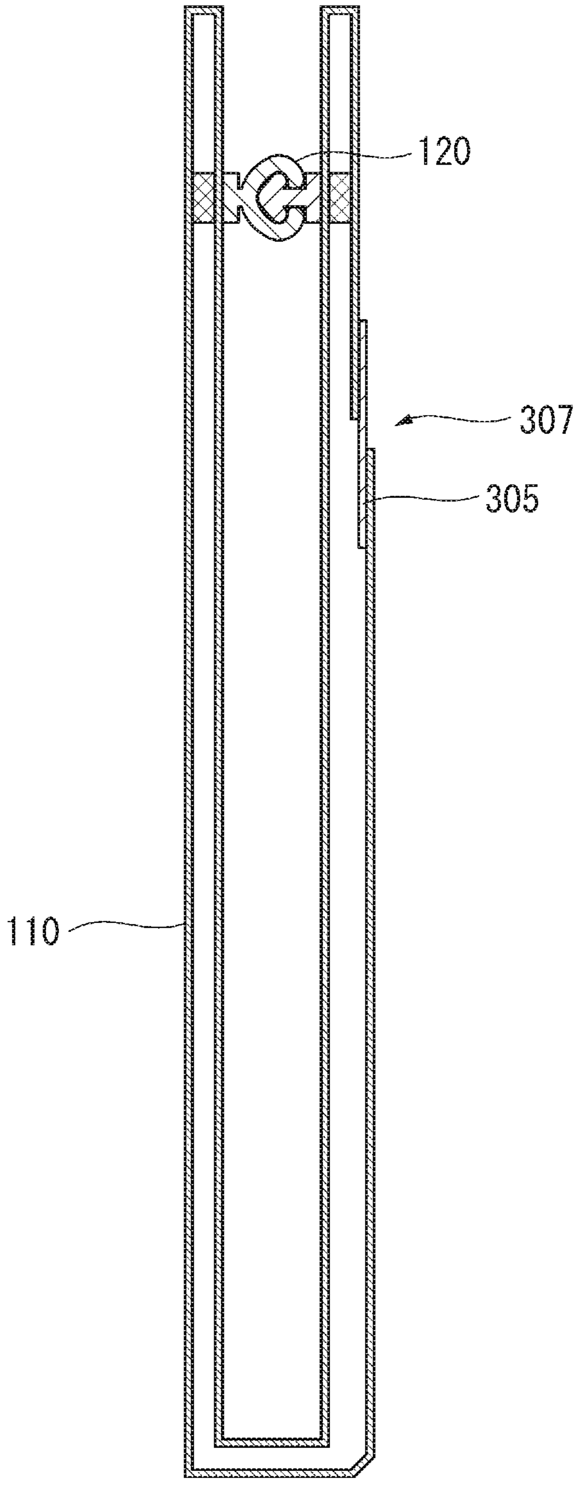
FIG. 11C is a cross-sectional view taken along a line C-C of FIG. 10.
Figure 11D:
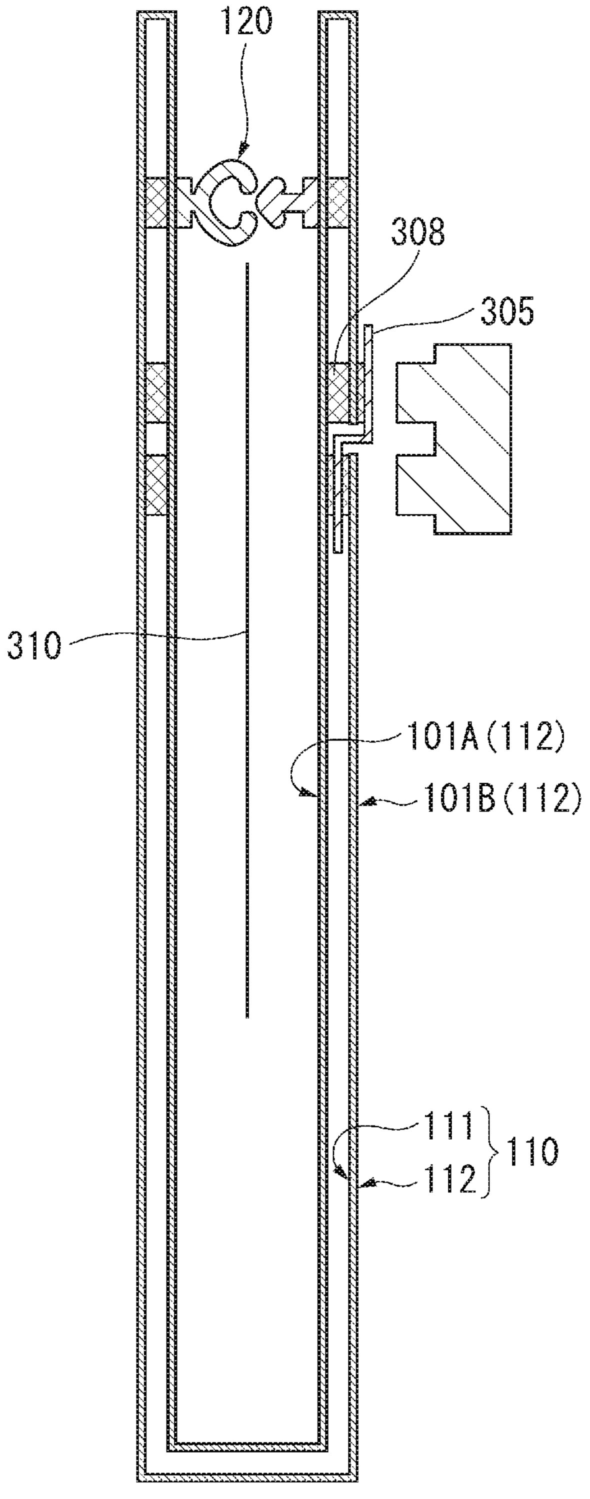
FIG. 11D is a cross-sectional view taken along a line D-D of FIG. 10.

FIG. 10 is a diagram illustrating a process of manufacturing the bag-shaped container according to the third embodiment of the invention. FIGS. 11A, 11B, 110, and 11D are cross-sectional views taken along a line A-A, a line B-B, a line C-C, and a line D-D of FIG. 10, respectively. In examples illustrated in the respective figures, the tubular film 110 in which the rib 309 is formed is overlapped on the zipper tape 120, and the zipper tape 120 is heat-sealed to the tubular film 110 along a portion to be an opening of the bag body (FIG. 11A). Thereafter, the slit 307 is formed in any one of the tubular films 110 along the zipper tape 120 (FIG. 11B). Thereafter, the air vent member 305 is inserted into the slit 307 at a predetermined position in a direction along the zipper tape 120 (FIG. 11C). In addition, the seal portions 308 are formed on the respective sides of the slit 307 to bond the parts of the inner surface 111 of the tubular film 110 to each other and to bond the air vent member 305 and the inner surface 111 of the tubular film 110 to each other (FIG. 11D). At this time, in order that parts of the inner surface 101A of the bag body are not fusion-bonded to each other, a fusion-bonding prevention member 310 such as a glass cloth sheet may be interposed therebetween. Further, an ultrasonic crushed portion 311 is formed at a position corresponding to an end portion, in a longitudinal direction, of the zipper tape 120 of after the bag manufacturing, and the tubular film 110 is cut and the side seal portions 103 and 104 are formed by using a fusing seal, thereby manufacturing the bag-shaped container 300.

In the present exemplary embodiment, the air vent member 305 serving as the air vent is inserted from the side near the opening of the bag body. Thus, as in the example described above, it is possible to form the side seal portions 103 and 104 in one step using the fusing seal in a manufacturing process, enabling efficient manufacturing. For example, in a case where the air vent member 105 is provided across the side seal portion 104 as in the example illustrated in FIG. 1, a step of leaving a portion of the side seal portion 104 unsealed and inserting the air vent member 105 therein is necessary.

In the example illustrated in FIG. 10, the tubular film 110 is conveyed in a state of being folded back at the bottom portion 102 of the bag body, and the zipper tape 120 is heat-sealed and the seal portion 308 is formed by pressing and heating from each of both sides of the bag body. However, in another example, the manufacturing apparatus including the drum sealing section 20 may be used as in the examples described above with reference to FIGS. 3 and 4. In this case, the tubular film 110 is conveyed in a state prior to being folded back at the bottom portion 102 of the bag body. Also in this case, unlike the example illustrated in FIGS. 9 and 13, the seal portion 308 may not be formed on a side, of the tubular film 110, in which the slit 307 is not formed. In the above-described examples, the slit 307 is formed along the zipper tape 120 after the zipper tape 120 is heat-sealed to the tubular film 110; however, the slit 307 may be formed at a position where the zipper tape 120 is to be heat-sealed to the tubular film 110 before the heat sealing of the zipper tape 120.

Configuration of Air Vent

Figure 12A:
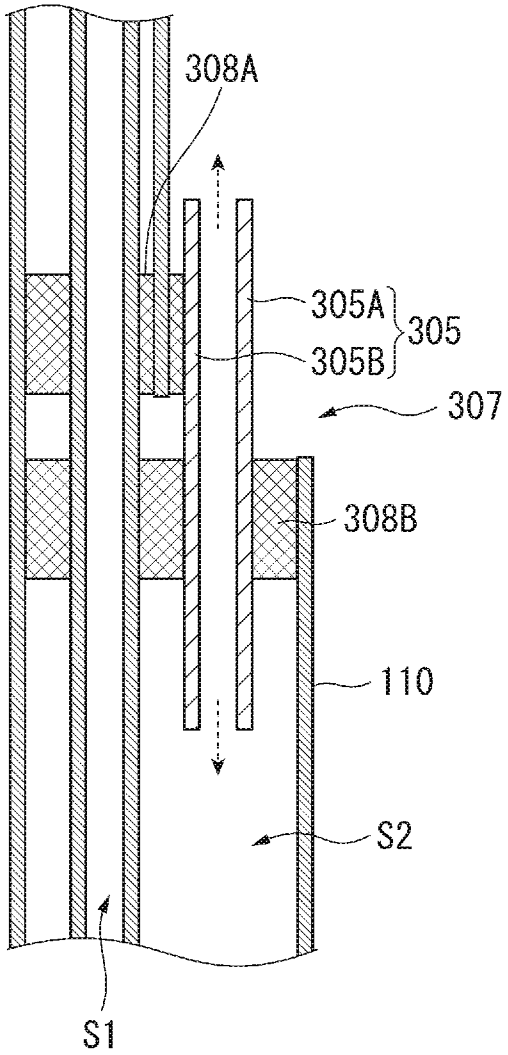
FIG. 12A is a cross-sectional view taken along a line XII-XII of FIG. 8.
Figure 12B:
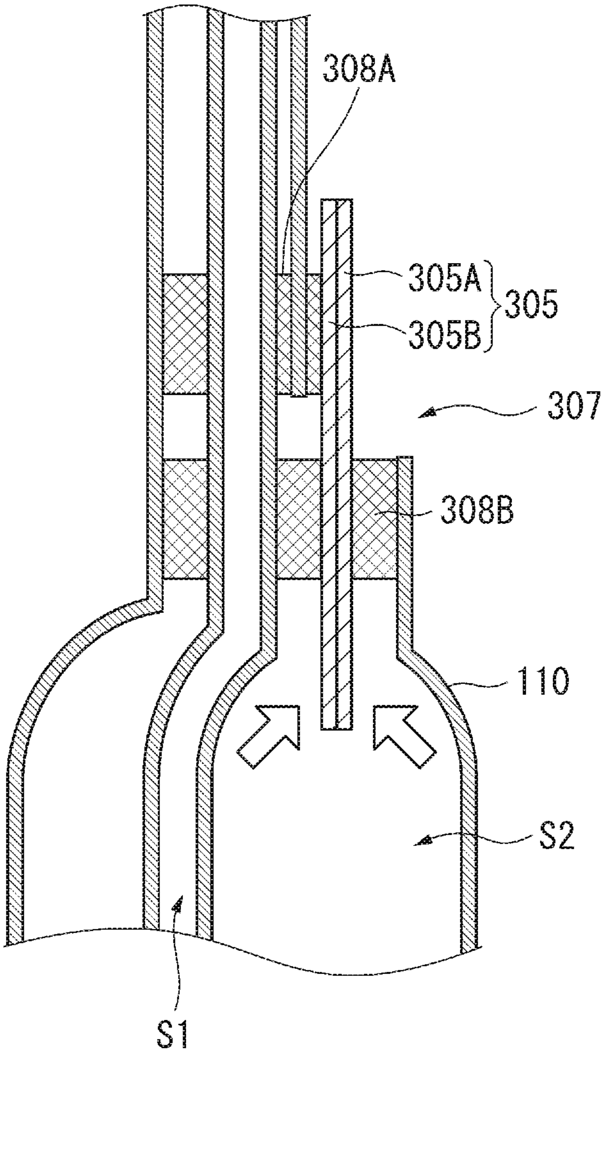
FIG. 12B is another cross-sectional view taken along the line XII-XII of FIG. 8.

FIGS. 12A and 12B are each a cross-sectional view taken along a line XII-XII of FIG. 8. In the illustrated example, the air vent member 305 has a pair of surfaces 305A and 305B sandwiched by parts of the side seal portion 308B. In this case, as illustrated in FIG. 12A, the gas flows by passing between the pair of surfaces 305A and 305B when the closed space S2 is not expanded by gas enclosure. In contrast, as illustrated in FIG. 12B, when the closed space S2 is expanded by the gas enclosure, the pair of surfaces 305A and 305B is pressed against each other by the pushed-out tubular film 110, and the gas does not flow through the air vent member 305. The air vent member 305 thus operates as a check valve in the illustrated example. The pair of surfaces 305A and 305B of the air vent member 305 may include, for example, a plurality of films put together in a tubular shape, a single folded film, or a single film formed in a tubular shape.

Preferred embodiments of the invention have been described above in detail with reference to the accompanying drawings, but the present invention is not limited to such embodiments. It is apparent that a person having ordinary skill in the art of the invention can arrive at various alterations and modifications within the scope of the technical idea recited in the appended claims, and it is understood that such alterations and modifications naturally fall within the technical scope of the invention.

The invention claimed is:

1. A bag-shaped container comprising:

a tubular film having an inner surface and an outer surface, the tubular film being folded in a manner that the outer surface defines both an inner surface of a bag body and an outer surface of the bag body; and at least one pair of engagement portions that projects from the inner surface of the bag body, the engagement portions engaging with each other, wherein at least one closed space facing the inner surface of the tubular film is formed, the bag-shaped container further comprising a member forming an air vent communicating with the closed space, a slit is provided along a width direction of the bag body, in any one of the surfaces of the tubular film overlapped with each other, the member forming the air vent is inserted through the slit in a manner that one end of the member forming the air vent is positioned inside the tubular film and the other end thereof is positioned outside the tubular film, and a seal portion is provided on each of both sides of the slit to bond parts of the inner surface of the tubular film to each other and to bond the member forming the air vent and the inner surface of the tubular film to each other.

2. The bag-shaped container according to claim 1, wherein the slit is provided over an entire width of the bag body.

3. The bag-shaped container according to claim 1, wherein, in each of respective regions near sites where the at least one pair of engagement portions project, the inner surfaces of the tubular film are bonded to each other between portions of the tubular film that define the inner surface of the bag body and the outer surface of the bag body, respectively.

4. The bag-shaped container according to claim 1, further comprising:

a pair of base strips that are bonded to the inner surface of the bag body, wherein the engagement portions project from the inner surface of the bag body via the pair of base strips.

5. The bag-shaped container according to claim 4, wherein one of the pair of base strips is not bonded to the inner surface of the bag body in a part near an opening of the bag body in relation to a position where the engagement portion projects.

6. The bag-shaped container according to claim 1, wherein the outer surface of the tubular film includes a resin including polyethylene as a main component.

7. A method of manufacturing a bag-shaped container, the bag-shaped container comprising:

a tubular film having an inner surface and an outer surface, the tubular film being folded in a manner that the outer surface defines both an inner surface of a bag body and an outer surface of the bag body, and a zipper tape comprising: a pair of base strips bonded to the inner surface of the bag body;

and engagement portions projecting from the respective pair of base strips, the method comprising:

conveying the tubular film and the zipper tape continuously in a longitudinal direction to wind the tubular film and the zipper tape around a circumferential surface of a drum in a state in which the tubular film and the zipper tape are overlapped with each other;

heat-sealing the zipper tape to the tubular film by using a seal bar having a sealing surface, the sealing surface being opposed to the circumferential surface of the drum, forming a slit in any one of surfaces of the tubular film at a position near where the zipper tape is to be heat-sealed to the tubular film, the slit extending in a width direction of the bag body;

inserting, through the slit, a member forming an air vent from outside the tubular film to inside the tubular film; and bonding, on both sides of the slit, parts of the inner surface of the tubular film to each other and the member forming the air vent and the inner surface of the tubular film to each other.

8. The method of manufacturing the bag-shaped container according to claim 7, wherein at least one of the circumferential surface of the drum or the sealing surface of the seal bar has a groove, the groove extending along a direction in which the tubular film and the zipper tape are conveyed, and having a width larger than a width of each of the engagement portions, and each of the engagement portions passes through the groove.

* * * * *